United States Patent [19]

Nakabayashi et al.

[11] Patent Number: 5,379,395
[45] Date of Patent: Jan. 3, 1995

[54] SEMICONDUCTOR INTEGRATED CIRCUIT FOR CENTRAL PROCESSOR INTERFACING WHICH ENABLES RANDOM AND SERIAL ACCESS TO SINGLE PORT MEMORIES

[75] Inventors: Takeo Nakabayashi; Harufusa Kondoh, both of Hyogo, Japan

[73] Assignee: Mitsubishi Denki Kabushiki Kaisha, Tokyo, Japan

[21] Appl. No.: 724,668

[22] Filed: Jul. 2, 1991

[30] Foreign Application Priority Data

Jul. 11, 1990 [JP] Japan .................................. 2-185090

[51] Int. Cl.6 .............................................. G06F 3/00
[52] U.S. Cl. ................................... 395/425; 364/241.9; 364/243; 364/252; 364/251; 364/DIG. 1
[58] Field of Search .......................... 395/500, 425, 275

[56] References Cited

U.S. PATENT DOCUMENTS

| 4,755,937 | 7/1988 | Glier | 395/425 |
| 4,821,185 | 4/1989 | Esposito | 395/275 |
| 5,058,051 | 10/1991 | Brooks | 395/425 |
| 5,099,331 | 3/1992 | Truong | 358/183 |
| 5,133,062 | 7/1992 | Joshi | 395/500 |
| 5,155,807 | 10/1992 | Blevins | 395/200 |
| 5,222,213 | 6/1993 | Petty | 395/164 |

OTHER PUBLICATIONS

"Printer Buffer Proves RAM-Based Logic's Strength and Versatility" by S. Landry, Electronic Design, Nov. 14, 1985 pp. 139–144.
DE Firms publication, VALVO, Technische Information, No. 83-1031, 1983, pp. 1–12.

Primary Examiner—Eric Coleman
Attorney, Agent, or Firm—Lowe, Price, LeBlanc & Becker

[57] ABSTRACT

A semiconductor integrated circuit serves as an interface between a CPU and the outside enabling communication between systems. More specifically, when a selector is switched to the CPU side, RAMs are accessed at random by the CPU to write data therein, and when the selector is switched to transmission controlling portion, the RAMs are serially accessed by the transmission controlling portion to read data therefrom to be transmitted. When selectors are switched to a reception controlling portion side, RAMs are serially accessed by the reception controlling portion to write data therein, and when the selectors are switched to the CPU side, the RAMs are accessed at random by the CPU to read data therefrom.

9 Claims, 5 Drawing Sheets

SEMICONDUCTOR INTEGRATED CIRCUIT FOR CENTRAL PROCESSOR INTERFACING WHICH ENABLES RANDOM AND SERIAL ACCESS TO SINGLE PORT MEMORIES

BACKGROUND OF THE INVENTION

1. Field of the Invention

The present invention relates to semiconductor integrated circuits. More specifically, the present invention relates to a semiconductor integrated circuit serving as an interface between a CPU and the outside for communication between systems.

2. Description of the Background Art

FIG. 7 is a schematic block diagram of a data processing system having a function of communication between a CPU and the outside, and FIG. 8 shows a format of a HDLC (High-level Data Link Control) frame transmitted by the system shown in FIG. 7.

In FIG. 7, a CPU 1, a memory 2, a DMA controller 3 and an I/O device 4 are connected to each other by a system bus 5. Communication lines 6 and 7 are connected to the I/O device 4 for communication with the outside.

The operation of the system shown in FIG. 7 will be described. Communication under transmission control by the HDLC format shown in FIG. 8 will be described as an example. As shown in FIG. 8, the HDLC frame format comprises an opening flag F1 of 1 byte indicating the head of the frame, an address field A of 1 or 2 bytes, a control field C of 1 or 2 bytes, an information field I whose number of bytes is changed frame by frame, a frame check sequence FCS of 2 bytes, and a closing flag F2 of 1 byte indicating the end of the frame.

Generally, the I/O device 4 has an FIFO therein. When communication is to be done by using the frame of FIG. 8, the CPU 1 once sets data to be transmitted, that is, the information field I on the memory 2 through the system bus 5, generates a control signal requesting data transmission to the I/O device 4 through the system bus 5 and successively writes data to be transmitted in the FIFO in the I/O device 4 through the system bus 5.

When DMA transfer is to be carried out, data transfer from the memory 2 to the I/O device 4 is carried out by the DMA controller 3 through the system bus 5. Then the I/O device 4 carries out the transmitting process to transmit data to the communication line 7. In the reverse operation, that is, when data is to be received, the I/O device 4 carries out data receiving process while writing the information field I in the FIFO of the I/O device. Meanwhile, the CPU 1 monitors the state of the FIFO in the I/O device, and appropriately reads data from the FIFO through the system bus to write the same to the memory 2, so as to prevent an overflow of the FIFO.

In the data processing system having the communicating function between the CPU and the outside shown in FIG. 7, the communication process is conventionally carried out in the above described manner. Therefore, the load of the CPU 1 with respect to data transmission and reception is large. In addition, the period of occupation of the system bus 5 for data transfer is long.

SUMMARY OF THE INVENTION

Therefore, an object of the present invention is to provide, in a data processing system having a function of communication between a CPU and the outside, a semiconductor integrated circuit for an interface capable of reducing load of the CPU related to the communication and reducing period of occupation of the system bus for data transfer.

Another object of the present invention is to provide a semiconductor integrated circuit for an interface in which data can be written to a memory by random access from a CPU and data can be read and output from the memory in response to external serial access.

A further object of the present invention is to provide a semiconductor integrated circuit for an interface in which data can be written to a memory by external serial access and data can be read from the memory by random access from the CPU.

Briefly stated, the present invention provides a semiconductor integrated circuit serving as an interface between a central processing means and the outside for carrying out communication between systems, including a plurality of single port memories for reading and outputting externally the data written by the central processing means, the plurality of single port memories having storage capacity for storing data exchanged between the central processing means and the outside; wherein in response to an instruction from the central processing means, the plurality of single port memories are accessed at random to write data therein, and the plurality of single port memories are externally and serially accessed to read data therefrom.

In another aspect of the present invention, a plurality of single port memories are provided for writing data applied externally and for reading the same to the central processing means for outputting, the plurality of single port memories having storage capacity for storing data exchanged between the central processing means and the outside, wherein a plurality of single port memories are serially accessed from the outside to write data therein, and a plurality of single port memories are accessed at random in response to an instruction from the central processing means to read data therefrom.

Therefore, in accordance with the present invention, memory means can be structured to serve as an interface between the central processing means and the outside, regarded by the central processing means as a memory having random access function, and regarded from the outside as a first in first out, so that the load of the CPU can be reduced and the period of occupation of the system bus for data transfer can be reduced.

In a preferred embodiment, a selecting circuit for switching serial accessing by a serial access circuit and random accessing by a random access circuit is provided. In response to serial accessing of the plurality of serial port memories by the serial access circuit, the selecting circuit inhibits random accessing of a plurality of serial port memories by the random access circuit. The selecting circuit allows, in response to serial accessing of any of the plurality of serial port memories by the serial access circuit, random accessing of other serial port memories by the random access circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
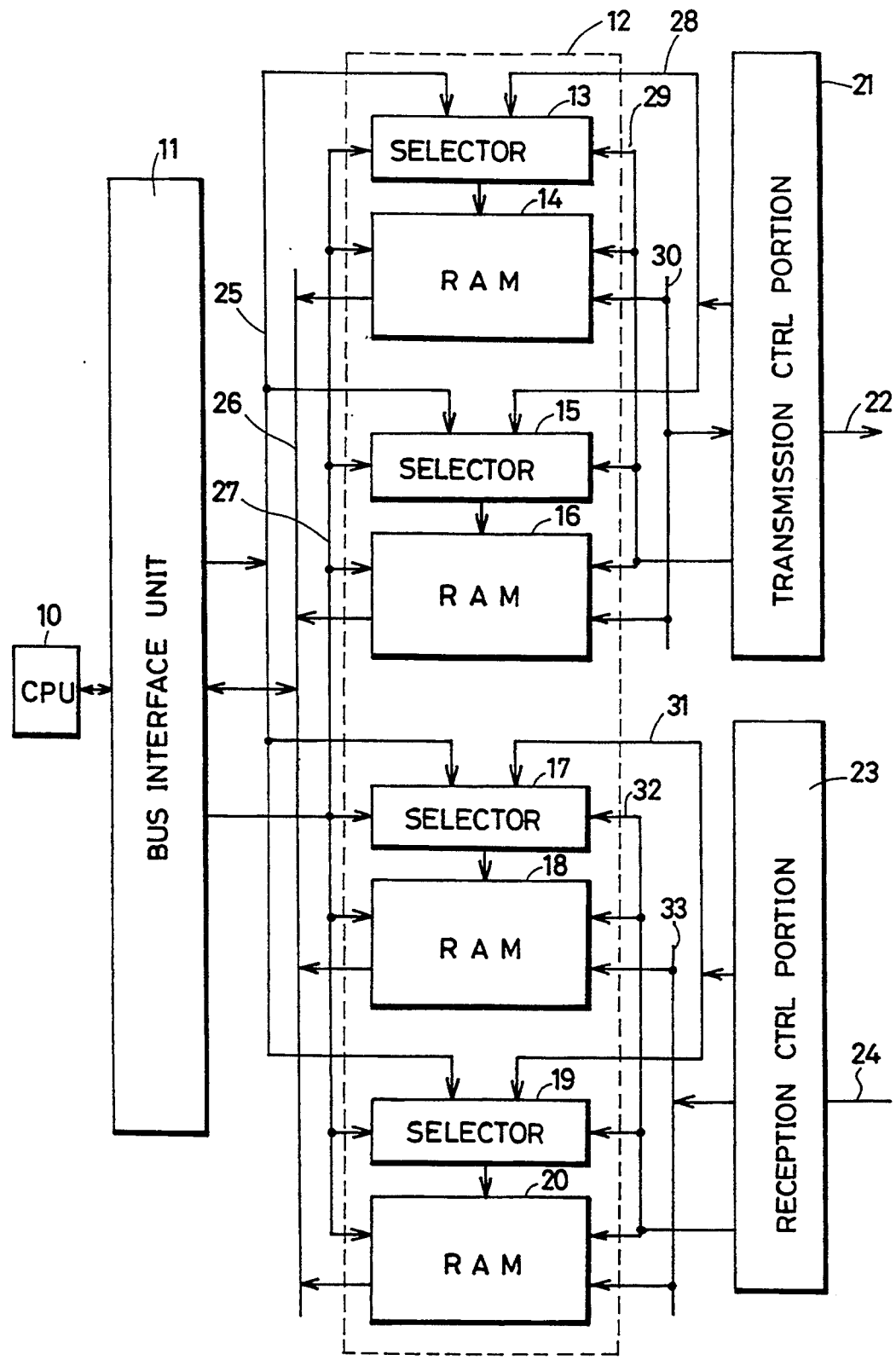
FIG. 1 is a schematic block diagram of one embodiment of the present invention.

FIG. 1 is a schematic block diagram of one embodiment of the present invention. Referring to FIG. 1, memory means 12 is connected to a CPU 12 through a bus interlace unit 11, an address line 25, a data line 26 and a control line 27. A transmitting control portion 21 is connected to the memory means 12 through an address line 28, a control line 29 and a data line 30, and a reception controlling portion 23 is also connected to the memory means 12 through an address line 31, a control line 32 and a data line 33. The CPU 10 writes data to and read data from the memory means 12 by accessing the same at random. The transmission controlling portion 21 serially accesses the memory means 12 to read therefrom, generates an HDLC frame format to output the same to the output line 22. The reception controlling portion 23 serially accesses the memory means 12 to write data therein in accordance with the HDLC frame format transmitted form the outside to the input line 24.

More specifically, selectors 13, 15, 17 and 19 apply an address signal applied from the CPU 10 through the bus interface unit 11 and the address line 25 to RAMs 14, 16, 18 and 20 for random accessing, in response to a control signal applied from the CPU 10 through the bus interface unit 11 and the control line 27, so as to write or read data applied from the CPU 10 through the bus interface unit 11 and the data line 26.

Selectors 13, 15, 17 and 19 apply an address signal applied from the transmission controlling portion 21 through the address line 28 to RAMs 14 and 16 for serial accessing, in response to a control signal applied from the transmission controlling portion 21 through the control line 29, so as to write data applied from the transmission controlling portion 21 through the data line 30. Selectors 17 and 19 apply an address signal provided from the reception controlling portion 23 through the address line 31 to RAMs 18 and 20 for serially accessing the same in response to a control signal applied from the reception controlling portion 23 through the control line 32, so as to write data applied through the data line 33.

Figure 2:
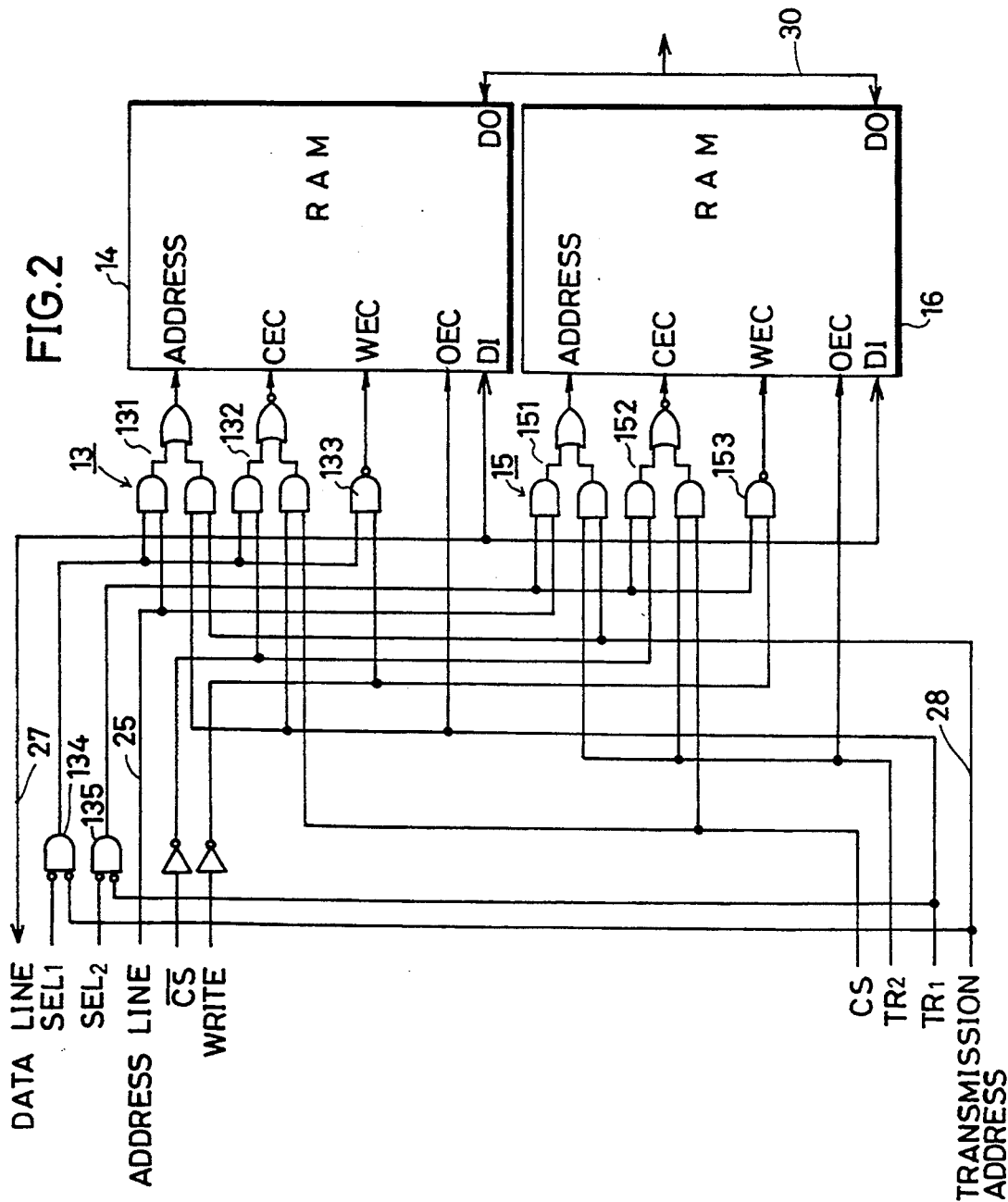
FIG. 2 is a specific block diagram of a transmitting control side of the memory means shown in FIG. 1.

FIG. 2 is a specific block diagram showing a transmitting side of the memory means shown in FIG. 1. Referring to FIG. 2, the selector 13 comprises gate switching circuits 131 and 151 for switching between the address line 25 from the CPU 10 and the address line 28 from the transmission controlling portion 21; gate switching circuits 132 and 152 for switching between a chip select signal $\overline{CS}$ from the CPU 10 and a chip select signal CS from the transmission controlling portion 21; and NAND gates 133 and 153 for switching and applying a write signal from the CPU 10 to the RAM 14 or 16. Signals SEL1 and SEL2 are used for switching between the RAMs 14 and 16. More specifically, since the data lines 27 and 30 have 8 bit structures, data of 8 bits are written or read time-divisionally to the RAMs 14 and 16.

Signals TR1 and TR2 indicate that the transmission controlling portion 21 is transmitting data. When these signals TR1 and TR2 are at "H" level, access from the CPU 10 is inhibited. Therefore, the signal SEL1 and the signal TR1 are applied to the gate circuit 134, while the signal SEL2 and the signal TR2 are applied to the gate circuit 135.

The operation will be described. When the RAMs 14 and 16 are to be accessed at random from the CPU 10, first, the signal SEL1 is set to "L" level, the signals TR1 and TR2 attain to "H" level, and an output from the gate circuit 134 attains to the "H" level. The gate switching circuit 131 selects the address line 25 from the CPU 10 to apply an address signal to the RAM 14. The gate switching circuit 132 selects a chip select signal $\overline{CS}$ from the CPU 10, and the NAND gate 133 applies a write signal from the CPU 10 to the RAM 14. Consequently, the RAM 14 is accessed at random, and data from the data line 27 is written to the RAM 14.

Then, when the signal SEL2 attains to "L" level, the address line 25 is selected by the gate switching circuit 151 in the same manner, the chip select signal $\overline{CS}$ is selected by the gate switching circuit 152, a write signal is selected by the NAND gate 153, and the RAM 16 is accessed at random, so that the data from the data line 27 is written to the RAM 16.

When serial accessing is to be done by the transmission controlling portion 21, the signal TR1 attains to "H" level, and output of the signal SEL1 is inhibited by the gate circuit 134. Since the signal TR1 has attained the "H" level, the gate switching circuit 131 selects the address line 28 from the transmission controlling portion 21, the gate switching circuit 132 selects the chip select signal CS from the transmission controlling portion 21 to apply the same to the RAM 14, and the signal TR1 is applied as an output enable signal OEC to the RAM. Consequently, the RAM 14 is serially accessed, and the read data is output to the data line 30.

When the signal TR2 attains to the "H" level, the gate switching circuit 151 selects the address line 28, the gate switching circuit 152 selects the chip select signal CS from the transmission controlling portion 21 to apply the same to the RAM 16, and the signal TR2 is applied as the output enable signal OEC to the RAM 16. Consequently, the RAM 16 is serially accessed and the read data is output to the data line 30.

Figure 3:
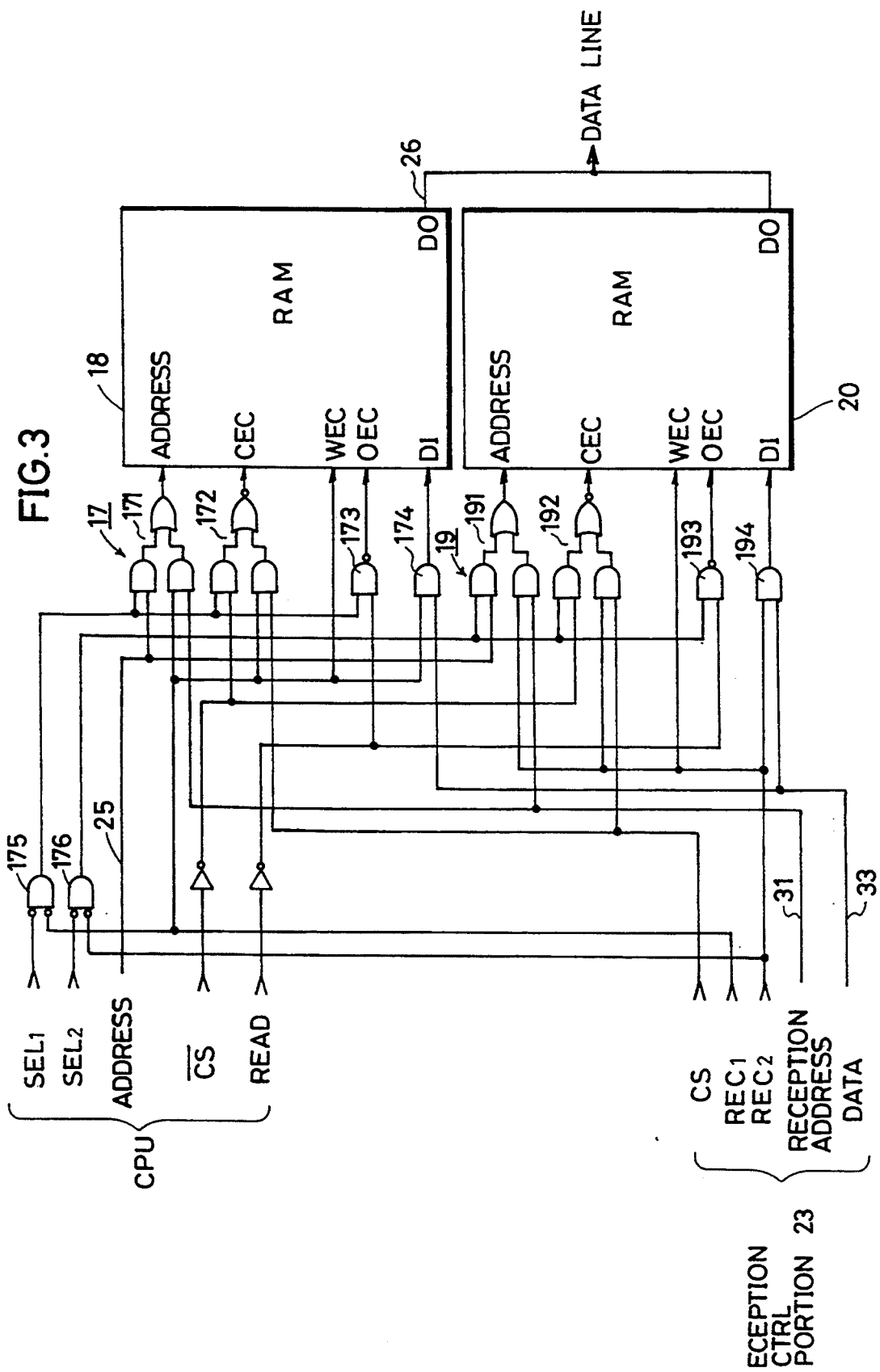
FIG. 3 is a specific block diagram of a receiving control side of the memory means shown in FIG. 1.

FIG. 3 is a specific block diagram showing the reception side of the memory means shown in FIG. 1. Referring to FIG. 3, the selector 17 comprises gate switching circuits 171 and 191 for switching between an address line 25 from the CPU 10 and an address line 31 from the reception controlling portion 23; gate switching circuits 172 and 192 for switching between the chip select signal $\overline{CS}$ from the CPU 10 and the chip select signal CS from the reception controlling portion 23; NAND gates 173 and 193 for applying a read signal from the CPU 10 as an output enable signal OEC to a RAM 18 or 20; and AND gates 174 and 194 for selectively applying the data line 33 from the reception controlling portion 23 to the RAM 18 or 20.

The signals SEL1 and SEL2 are used to switch between the RAMs 18 and 20, as described with reference to FIG. 2. Signals REC1 and REC2 indicate that the reception controlling portion 23 is receiving data. When the signals REC1 and REC2 are at the "H" level, access from the CPU 10 is inhibited. Therefore, the signals SEL1 and REC1 are applied to the gate circuit 175, and the signals SEL2 and REC2 are applied to the gate circuit 176.

The operation will be described. When data is to be written by serially accessing the RAMs 18 and 20 by the reception controlling portion 23, the signal REC1 attains to the "H" level, and an output of the signal SEL1 is inhibited by the gate circuit 175. Since the REC1 signal has attained to the "H" level, the gate switching circuit 171 selects the address line 31 of the reception controlling portion 23, the gate switching circuit 172 selects the chip select signal CS from the reception controlling portion 23, the AND gate 174 selects the data line 33 of the reception controlling portion 23, and the signal REC1 is applied to the RAM 18 as a write enable signal WEC. Consequently, the RAM 18 is accessed at random in response to the address signal, so as to write data from the data line 33.

Then, when the signal REC2 attains to the "H" level, the gate switching circuit 191 selects the address line 31 from the reception controlling portion 23, the gate switching circuit 192 selects the chip select signal CS, and the AND gate 194 selects the data line 33. Further, the signal REC2 signal is applied as a write enable signal WEC to the RAM 20. Consequently, the RAM 20 is serially accessed in response to the address signal, to write data from the data line 33.

When data written in the RAMs 18 and 20 is to be read by random accessing from the CPU 10, first the signal SEL1 attains to the "L" level, the signals REC1 and REC2 attain to the "L" level, and the output of the gate circuit 175 attains to the "H" level. Consequently, the gate switching circuit 171 selects the address line 25 from the CPU 10 to apply an address signal to the RAM 18. The gate switching circuit 172 selects the chip select signal $\overline{CS}$ from the CPU 10, and the NAND gate 173 applies a read signal from the CPU 10 as an output enable signal OEC to the RAM 18. Consequently, the RAM 18 is accessed at random, and data is read and output to the data line 26 of the CPU 10.

When the signal SEL2 attains to "L" level, the gate switching circuit 191 selects the address line 25 of the CPU 10, the gate switching circuit 192 selects the chip select signal $\overline{CS}$ and a read signal is selected by the NAND gate 193, to be applied to the RAM 20. Consequently, the RAM 20 is accessed at random in response to an address signal, and data is read to be outputted to the data line 26.

Figure 4:
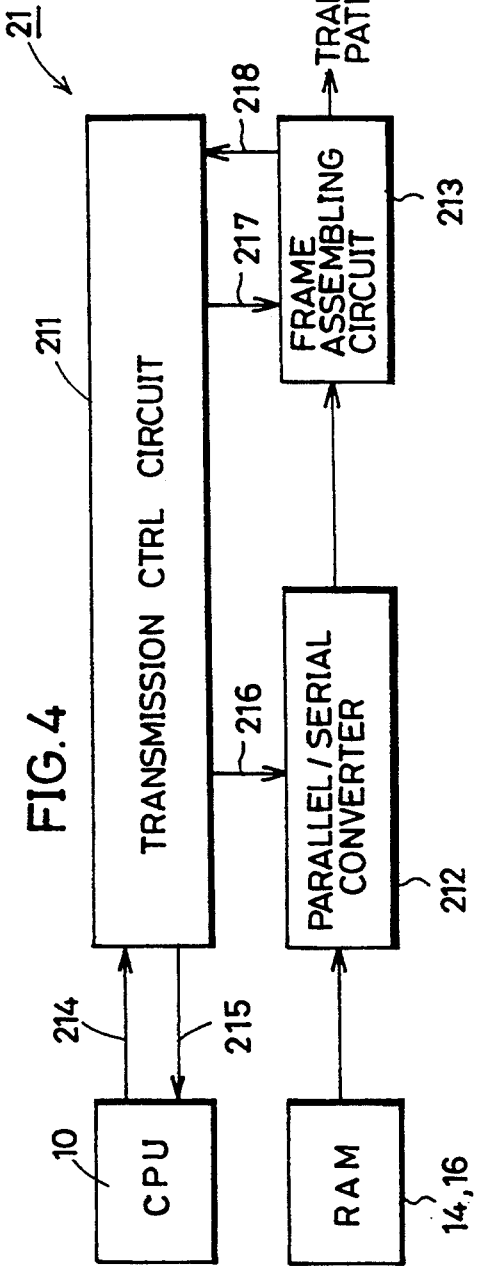
FIG. 4 is a schematic block diagram of a transmission controlling portion.
Figure 8:
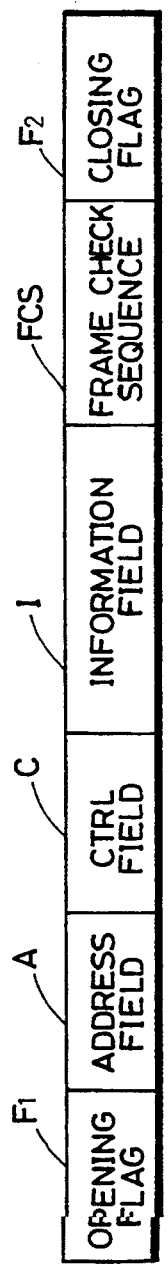
FIG. 8 shows a format of a HDLC frame.

FIG. 4 is a schematic block diagram of the transmission controlling portion. Referring to FIG. 4, the transmission controlling portion 21 comprises a transmission controlling circuit 211, a parallel/serial converting circuit 212 and a frame assembling circuit 213. Instruction signals 214 such as transmission request and transmission stoppage are applied from the CPU 10 to the transmission controlling circuit 211. A transmission completion signal 215 is applied from the transmission controlling circuit 211 to the CPU 10. The parallel/serial converting circuit 212 converts, in response to a control signal from the transmission controlling circuit 211, parallel data read from the RAMs 14 and 16 to serial data to apply the same to the frame assembling circuit 213. A control signal 217 is applied from the transmission controlling circuit 211 to the frame assembling circuit 213, and indication signals 218 indicating states or the like are applied from the frame assembling circuit 213 to the transmission controlling circuit 211. The frame assembling circuit 213 provides, in response to the data applied from the parallel/serial converting circuit 212 and to frame and address signals included in the control signals applied from the transmission controlling circuit 211, an HDLC frame format such as shown in FIG. 8 to output the same to a transmission path.

Figure 5:
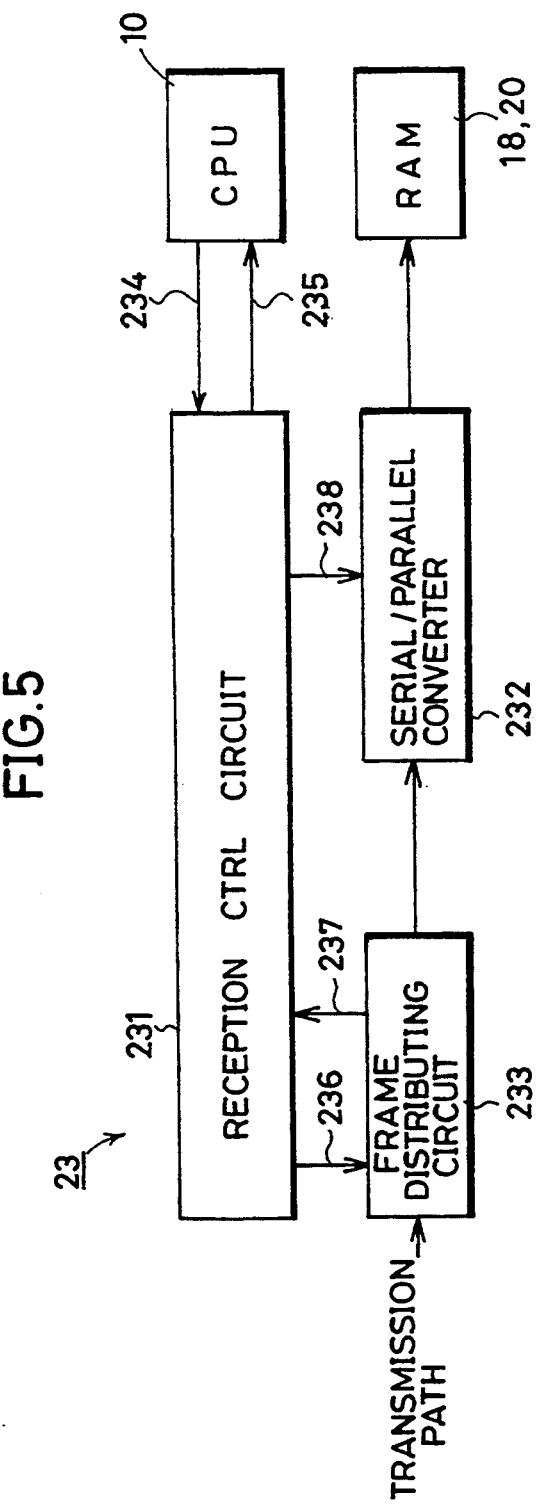
FIG. 5 is a schematic block diagram of a reception controlling portion.

FIG. 5 is a schematic block diagram of the reception controlling portion. The reception controlling portion 23 comprises a reception controlling circuit 231, a serial/parallel converting circuit 232 and a frame distributing circuit 233. Instruction signals such as data reception are applied to the reception controlling circuit 231 from the CPU 10, and a reception completion signal 235 is applied from the reception controlling circuit 231 to the CPU 10. Control signals 236 are applied form the reception controlling circuit 231 to the frame distributing circuit 233, and indication signals 237 indicating states or the like are applied from the frame distributing circuit 233 to the reception controlling circuit 231. The frame distributing circuit 233 distributes, in response to control signals provided from the reception controlling circuit 231, the HDLC frame format transmitted from the transmission path and applies serial data to the serial/parallel converting circuit 232. Control signals 238 are applied from the reception controlling circuit 231 to the serial/parallel converting circuit 232. The serial/parallel converting circuit 232 converts serial data to parallel data to apply the same to the RAMs 18 and 20.

Figure 6:
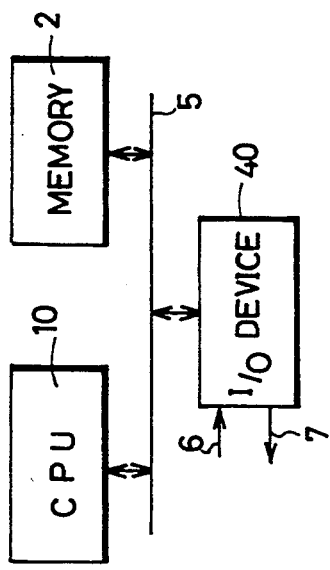
FIG. 6 is a block diagram showing a system in which the semiconductor integrated circuit in accordance with one embodiment of the present invention is used as an I/O device.
Figure 7:
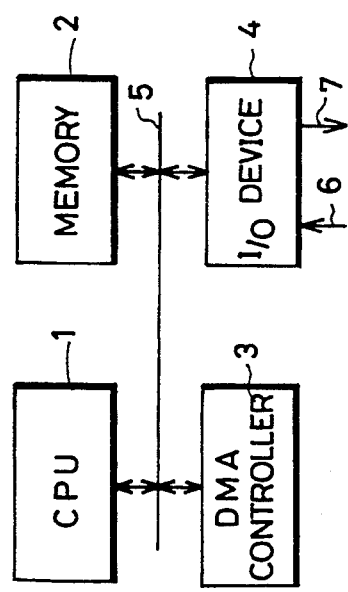
FIG. 7 is a block diagram showing a conventional system.

FIG. 6 is a block diagram showing a system in which a semiconductor integrated circuit in accordance with one embodiment of the present invention is used as an I/O device. Referring to FIG. 6, the CPU 10, the memory 2 and the I/O device 40 are connected by a system bus 5. A communication line 6 for reception and a communication line 7 for transmission are connected to the I/O device 40. When communication is to be done in accordance with HDLC procedure, transmission and reception of data are carried out by using the HDLC frame shown in FIG. 8. At this time, the data transmitted and received by the CPU 10 is the information field I, and data transmitted and received on the communication line are the HDLC frame of the format such as shown in FIG. 8. When data is to be transmitted from this system, the CPU regards the I/O device 40 not as an I/O but as a portion of a memory, and sets data to be transmitted in the I/O device 40 by random accessing. The I/O device 40 reads data by serially accessing internal memory means, assembles the HDLC frame format and transmits data to the communication line 7. When the operation is to be carried out continuously, the I/O device 40 transmits data from one RAM 16 while the CPU 10 is setting data to the other RAM 14, utilizing two RAMs 14 and 16 in the I/O device 40, as shown in FIG. 1.

When data is to be received by the system, the I/O device 40 writes the data received from the communication line 6 to the internal memory means by serial accessing, and the CPU 10 regards the I/O device 40 not as the I/O but a portion of a memory, and reads data from the I/O device 40 by random accessing. When reception is to be carried out continuously, the CPU 10 reads data from one RAM 20 while the I/O device 40 is writing received data in the other RAM 18, utilizing two RAMs 18 and 20 for reception provided in the I/O device 40.

Although two RAMs 14 and 16 for transmission and two RAMs 18 and 20 for reception are provided in the memory means 12 in the semiconductor integrated circuit in the above embodiment, three or four RAMs may be used for respective purposes, and by increasing the capacity of the RAMs in this manner, the same or more improved effects as in the above described embodiment can be provided, for example, there will be spare time of operation of the CPU 10.

As described above, according to the embodiment of the present invention, a semiconductor integrated circuit for I/O serving as an interface between the central processing means and the outside and including memory means which can be regarded as a memory having random access function by the internal central processing means and which can be regarded as a first in first out from the outside can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit serving as an interface between a central processing means and a data communications means, comprising:
    a plurality of single port memories provided for reading data written by said central processing means and outputting said data to said data communications means, having storage capacity for storing data exchanged between said central processing means and the data communications means, being randomly accessible from said central processing means and accessible on a first in first out basis from the data communications means;
    random access means responsive to an instruction from said central processing means for randomly accessing said plurality of single port memories; and
    serial access means responsive to an instruction from said data communication means for serially accessing said plurality of single port memories.

2. A semiconductor integrated circuit according to claim 1, further comprising,
    selecting means for selecting between random access by said random access means and serial access by said serial access means.

3. A semiconductor integrated circuit according to claim 2, wherein
    said selecting means comprises means for inhibiting serial access to said plurality of serial port memories said serial access means, in response to random accessing of said plurality of serial port memories by said random access means.

4. A semiconductor integrated circuit according to claim 2, wherein
    said selecting means comprises means for allowing, in response to random accessing of any of said plurality of single port memories by said random access means, serial accessing of other serial port memories by said serial access means.

5. A semiconductor integrated circuit serving as an interface between a central processing means and a data communications means for carrying out communication between systems, comprising:
    a plurality of single port memories provided for writing data received from said data communications means, transferring the same to said central processing means for outputting, having storage capacity for storing data exchanged between said central processing means and the data communications means, being randomly accessible from said central processing means and accessible on a first in first out basis from the data communications means;
    serial access means responsive to an instruction from said data communications means for serially accessing said plurality of single port memories; and
    random access means responsive to an instruction from said central processing means, for randomly accessing said plurality of single port memories.

6. A semiconductor integrated circuit according to claim 5, further comprising:
    selecting means for selecting between serial access by said serial access means and random access by said random access means.

7. A semiconductor integrated circuit according to claim 6, wherein
    said selecting means comprises means for inhibiting, in response to serial accessing of said plurality of serial port memories by said serial access means, random accessing of said plurality of serial port memories by said random access means.

8. A semiconductor integrated circuit according to claim 6, wherein
    said selecting means comprises means for allowing, in response to serial accessing of any of said plurality of single port memories by said serial access means, random accessing of other serial port memories by said random access means.

9. A semiconductor integrated circuit serving as an interface between a central processing means and a data communications means for carrying out communication between systems, comprising:
    a first plurality of single port memories provided for reading data written by said central processing means and outputting said data to said data communications means, having storage capacity for storing data exchanged between said central processing means and the data communications means, being randomly accessible from said central processing means and accessible on a first in first out basis from the data communications means;
    a second plurality of single port memories provided for writing data received from said data communications means, transferring the same to said central processing means for outputting, having storage capacity for storing data exchanged between said central processing means and the data communications means, being randomly accessible from said central processing means and accessible on a first in first out basis from the data communications means;
    random access means responsive to an instruction from said central processing means for randomly accessing said first and second plurality of single port memories for writing or reading data;
    first serial access means responsive to an instruction from said data communication means for serially accessing said first plurality of single port memories for reading data; and
    second serial access means responsive to an instruction from said data communications means for serially accessing said second plurality of single port memory for writing data.

* * * * *